United States Patent [19]

Buehring

[11] Patent Number: 5,063,291

[45] Date of Patent: Nov. 5, 1991

[54] OPTICAL GRATING WITH INTERPOLATOR HAVING MULTIPLYING MEANS TO PRODUCE QUADRATURE SIGNALS

[75] Inventor: Ian K. Buehring, Leicester, United Kingdom

[73] Assignee: Rank Taylor Hobson Limited, United Kingdom

[21] Appl. No.: 542,707

[22] Filed: Jun. 22, 1990

[30] Foreign Application Priority Data

Jun. 23, 1989 [GB] United Kingdom ............... 8914417

[51] Int. Cl.$^5$ ............................................. G01D 5/34
[52] U.S. Cl. ............................ 250/231.16; 250/237 G
[58] Field of Search ....................... 250/231.16, 231.14, 250/237 G; 356/375, 374; 33/707

[56] References Cited

U.S. PATENT DOCUMENTS

| | | | |
|---|---|---|---|
| 3,410,976 | 11/1968 | Watson | 250/231.16 |
| 3,755,682 | 8/1973 | Russell | 250/231.16 |
| 4,359,688 | 11/1982 | Haville | 328/20 |
| 4,468,617 | 8/1984 | Ringwall | 250/231.16 |
| 4,639,679 | 1/1987 | Kasperkovitz et al. | 328/20 |
| 4,823,000 | 4/1989 | Onyow | 250/231.14 |

FOREIGN PATENT DOCUMENTS 2047885 12/1980 United Kingdom .

Primary Examiner—David C. Nelms
Assistant Examiner—Que T. Le
Attorney, Agent, or Firm—Lerner, David, Littenberg, Krumholz & Mentlik

[57] ABSTRACT

An interpolator, particularly for use with an optical grating for detecting position in a metrological apparatus, receives input signals in quadrature. One of the input signals is squared and the two signals are multiplied together to provide further signals in quadrature at twice the frequency of the input signals. One of the further signals is also squared and the further signals are multiplied together to provide output signals at four times the frequency of the input signals. Filtering is provided to remove DC components, such as due to drift. In the illustrated metrological apparatus, the zero crossing points of the output signals are detected to effect sampling, with high resolution, of a surface sensor output. Interpolation noise occurs at a high frequency and is removed by low pass filtering of the sample signal from the surface sensor.

16 Claims, 3 Drawing Sheets

OPTICAL GRATING WITH INTERPOLATOR HAVING MULTIPLYING MEANS TO PRODUCE QUADRATURE SIGNALS

This invention relates to interpolators and to metrological apparatus including an interpolator.

In metrological apparatus in which a surface sensor traverses the surface of a workpiece for measuring surface characteristics, for example roughness or form, means may be provided for detecting relative movement between the workpiece support and the surface sensor whereby the output of the surface sensor may be sampled at regularly spaced points on the surface thus to provide information from which the required surface characteristics can be derived. Various forms of movement detector are known which produce quadrature signals which may be used to sample the surface sensor output, for example, at the zero crossing points of the quadrature signals. An example of such a movement detector is an optical grating and associated transducer arrangement which, in response to detection of light reflected from the grating, produces the quadrature signals.

A problem with such detectors, however, is that the frequency of the quadrature signals may not be high enough to provide the required resolution. It is known to increase the resolution by interpolation. Known interpolators comprise a bank of comparators to which the quadrature signals are supplied in various proportions and which output a series of sine waves having different phases from each other. A problem with such interpolators, however, is that the circuit design is relatively complex and they suffer from problems of noise.

There is known from U.S. Pat. No. 4359688 a frequency multiplying circuit for receiving quadrature signals (sinA and cosA) and outputting double frequency quadrature signals (sin2A and cos2A). It is suggested that such circuits could be cascaded, to produce quadruple frequency signals (sin4A and cos4A). The circuit uses the trigonometric identities $2\sin A\cos A = \sin 2A$ and $(\cos A + \sin A)(\cos A - \sin A) = \cos 2A$. The first identity is re-written as $(\cos A - 0)(2\sin A - 0) = \sin 2A$, and the double frequency signals are generated using four-input multipliers which generate an output of $K(a1-a2)(b1-b2)$ from inputs a1, a2, b1 and b2. The circuit is made complex by the need to provide four inputs to the amplifier which generates cos2A, and by the additional circuitry which is needed to generate the signals 2sinA and −sinA which are required by the multiplier inputs. In one aspect, the present invention provides an improved interpolator for receiving input quadrature signals and arranged to perform a mathematical operation thereon to provide output signals at double or quadruple or other multiples of the input frequency, the output signals being in quadrature, the interpolator comprising means which squares one of the input quadrature signals but not the other.

Preferably the interpolator uses one of the trigonometric identities $\sin^2 A = \tfrac{1}{2} - (\cos 2A)/2$ and $\cos^2 A = \tfrac{1}{2} + (\cos 2A)/2$. The DC component represented by the term "$\tfrac{1}{2}$" can be removed by a filter, to leave $-(\cos 2A)/2$ or $+(\cos 2A)/2$. The other trigonometric identity used can conveniently be $\sin A \cos A = (\sin 2A)/2$. These trigonometric identities require only simple multiplication of two inputs. Additionally, the only inputs required are sinA and cosA, so that no extra circuits are required to generate further input signals.

The invention is described further, by way of example, with reference to the accompany drawings in which.

Figure 1:
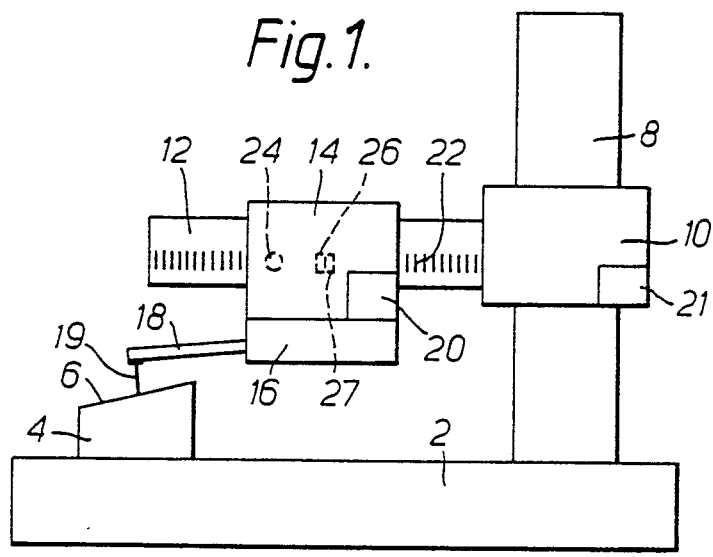
FIG. 1 is a diagram of a metrological apparatus in which the invention ma be embodied.
Figure 2:
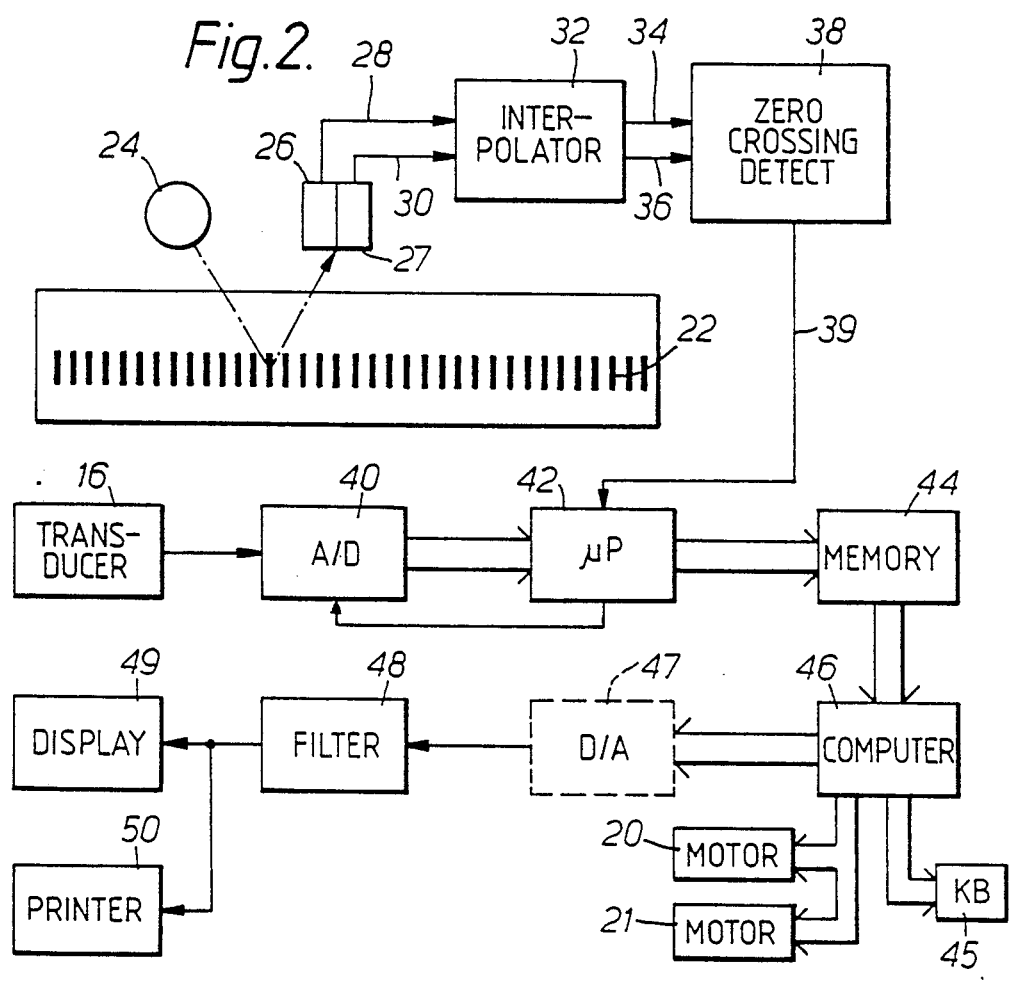
FIG. 2 is a simplified block diagram of electrical circuitry included in the apparatus of FIG. 1.

With reference to FIGS. 1 and 2, a metrological instrument for measuring surface texture or form comprises a base 2 for supporting a workpiece 4 having a surface 6 whose texture is to be measured. A vertical column 8 secured to the base 2 supports a vertically movable carriage 10 on which a horizontal datum bar 12 is mounted. A further carriage 14 is mounted for horizontal movement along the bar 12 and carries a transducer 16 having a stylus arm 18 which carries a stylus 19. A motor 20 indicated diagrammatically in FIG. 1 is provided on the carriage 14 for effecting horizontal movement thereof along the datum bar 12 and a further motor 21 is provided on carriage 10 for effecting vertical movement thereof up and down the column 8.

In operation of the apparatus, the carriage 10 is arranged at a vertical position such that the stylus 19 engages the surface 6. Thereafter, the motor 20 is operated to cause the carriage 14 to move horizontally along the datum bar 12 thus causing the stylus 19 to traverse the surface 6 to be measured.

A linear optical grating, shown schematically at 22 in FIG. 1, comprising a series of reflective and non-reflective bands, is fixed with respect to the datum bar 12 and light from a light source 24 is reflected from the grating 22 and detected by a pair of light sensors 26, 27 mounted on the carriage 14. Alternatively, the grating may be formed of a series of transmissive and non-transmissive bands, with the sensors 26, 27 arranged to detect light transmitted through the grating. A reference scale (not shown) may be provided associated with the sensors 26, 27. As the carriage moves along the datum bar 12, the sensors 26, 27 provide sinusoidal electrical signals on lines 28 and SO respectively. The sensors 26 and 27 are positioned so that the signals on lines 28 and 30 are in quadrature. These signals are applied to an interpolator 32 which causes their frequencies to be quadrupled. The interpolator 32 outputs the resulting signals on line 34 and 36 and supplies them to a zero crossing detector 38 which outputs pulses on line 39 in response to each zero crossing point in each of the signals on lines 34 and 36. In one commerically available sensor arrangement, if the grating 22 has a pitch of 8 microns, the signals from sensors 26, 27 have a period corresponding to 4 microns. A pulse then appears on line 39 for each 0.25 microns of movement of the carriage 14 along datum bar 12.

As the carriage 14 is moved along the datum bar 12 and the stylus 19 is thereby caused to traverse the workpiece surface 6, the stylus 19 moves substantially vertically in response to the features of surface texture and form of the surface 6. Transducer 16 is preferably an inductive transducer and, in response to this substantially vertical movement, produces an output signal which is digitised by an analogue-to-digital converter 40 and supplied to a microprocessor 42 which, in response to the pulses on lines 39, samples the digitised signal from transducer 16 at 0.25 micron intervals of movement of the carriage 14 along the datum bar 12 and stores the resulting samples in a memory 44. The analogue-to-digital converter 40 and the processing performed on the signal output therefrom by the microprocessor 42 may be as described in application filed concurrently herewith with agent's reference and claiming priority from UK patent applications 8914418.2 and 8914419.0. The concurrently filed application is incorporated herein by reference. The apparatus includes a computer 46 which is programmed to effect a general overall control of the apparatus, including control of the motors 20 and 21, and to process the signals stored in memory 44 to provide information as to the surface texture and form of the surface 6. A keyboard 45 is provided for inputting instructions to the computer 46. Signals representing the surface characteristics are output by computer 46, via a low pass filter 48 whose purpose will be further explained below, to a display device 49, such as a cathode ray tube, and a printer 50 which may be operable to produce a trace of the surface of the workpiece. The display device 49 and the printer 50 may use digital input signals. Alternatively, either or both of them may use analogue input signals, in which case the signals are passed through a digital-to-analogue converter 47 as shown in FIG. 2. The digital to analogue converter 47 may be placed before or after the filter 48, which will be an analogue or digital filter accordingly.

Figure 3:
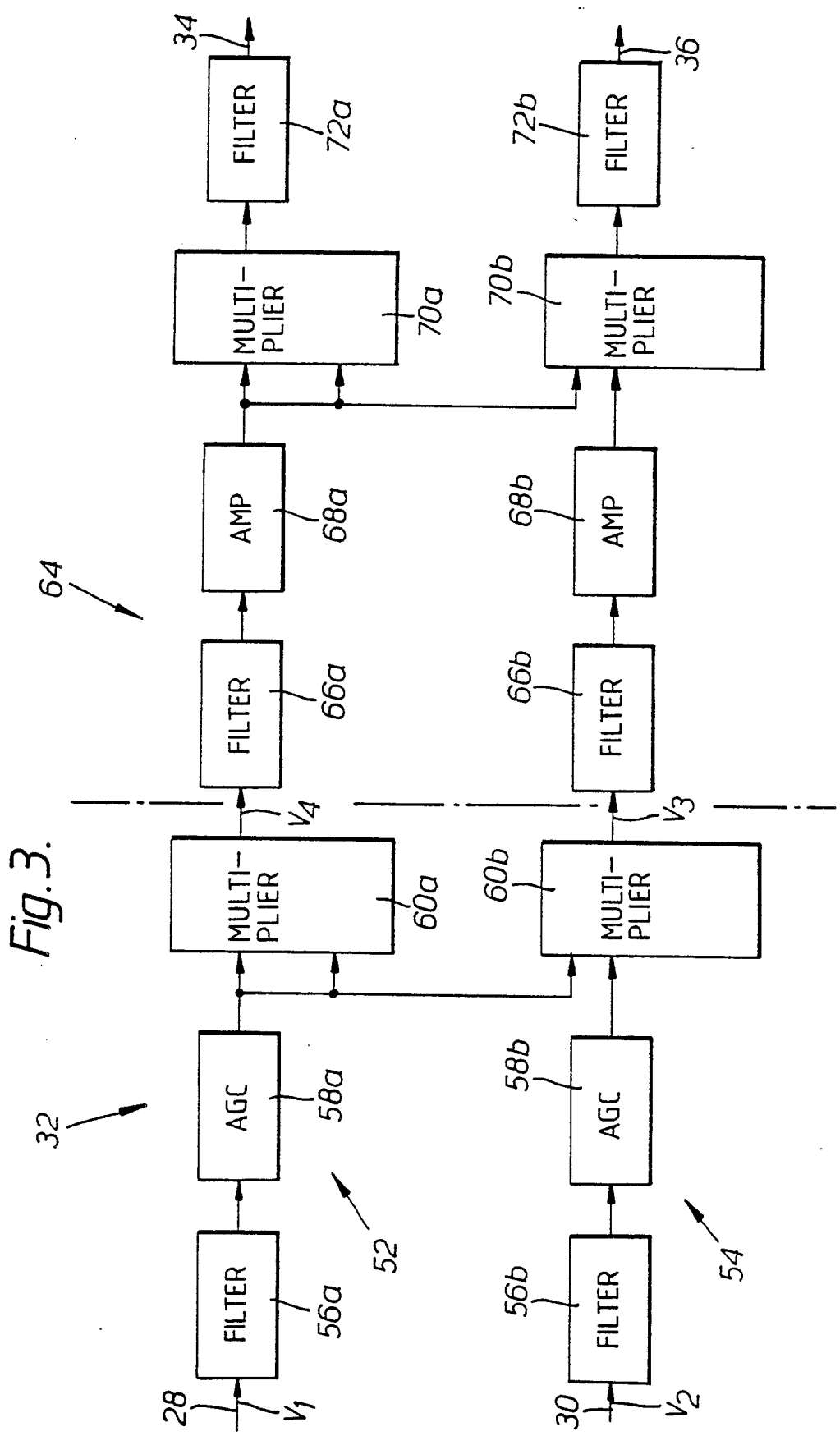
FIG. 3 is a block diagram of an interpolator according to a preferred embodiment of the invention, incorporated in the apparatus of FIGS. 1 and 2.

As shown in FIG. 3, the interpolator 32 comprises a first channel 52 which receives the signal on line 28 and a second channel 54 which receives the signal on line 30. The channels comprise filters 56a, 56b, automatic gain control circuits 58a, 58b multipliers 60a, 60b, all forming a first stage. A second stage 64 comprises filters 66a, 66b, amplifiers 68a, 68b, multipliers 70a, 70b and filters 72a, 72b.

As already explained, the signals on lines 28 and 30 are sinusoidal and in quadrature. However, each signal will in practice contain a DC offset component which will drift, as the optical sensors 26, 27 traverse the grating 22, due to variations in the reflectance of the grating along its length. Also, due to errors in the grating, the signals on lines 28 and 30 will generally not be in perfect quadrature but will contain a varying phase error. Thus, if the signals on lines 28 and 30 are respectively V1 and V2, they may be represented as follows:

$$V1 = \overline{V1} + \hat{V1} \sin\left(\frac{2\pi x}{\lambda}\right) \tag{1}$$

$$V2 = \overline{V2} + \hat{V2} \cos\left(\frac{2\pi x}{\lambda} + \phi\right) \tag{2}$$

where $\overline{V1}$, $\hat{V1}$ and $\overline{V2}$, $\hat{V2}$ are the DC mean and AC amplitude voltages respectively of the two signals, x is the traverse displacement, $\xi$ is the grating wavelength and $\phi$ is the phase error from quadrature.

Filters 56a and 56b are high pass filters and remove the DC drift components $\overline{V1}$ and $\overline{V2}$ from these signals. Automatic gain control circuits 58a and 58b eliminate any fluctuations in the amplitude of the two signals arising from errors in the grating. Multiplier 60b, multiplies processed signals as output by the automatic gain control circuits to produce a signal V3:

$$V3 = \hat{V1}\hat{V2} \sin\left(\frac{2\pi x}{\lambda}\right)\cos\left(\frac{2\pi x}{\lambda} + \phi\right) \tag{3}$$

which can be expressed as:

$$V3 = \frac{\hat{V1}\hat{V2}}{2}\left[\sin(-\phi) + \sin\left(\frac{4\pi x}{\lambda} + \phi\right)\right] \tag{4}$$

$\sin(-\phi)$ is removed by filter 66b to leave a sine signal at twice the input frequency.

Multiplier 60a multiplies the processed signal as output by automatic gain control circuit 58a, by itself to provide a signal V4:

$$V4 = \hat{V1}^2 \sin^2\left(\frac{2\pi x}{\lambda}\right) \tag{5}$$

Using the trigonometric equality:

$$\sin^2 A = \tfrac{1}{2} - (\cos 2A)/2 \tag{6}$$

$$V4 = \frac{\hat{V1}^2}{2}\left[1 - \cos\left(\frac{4\pi x}{\lambda}\right)\right] \tag{7}$$

Filter 66a removes the DC term from Equation 7 leaving a cosine signal at twice the input frequency.

If the inputs to interpolator 32 are reversed, signal V1 will be input on line 30 and signal V2 will be input on line 28. In this case, the output from multiplier 60b will be the same as in equations (3) and (4), but the output from multiplier 60a will be a reversed phase cosine signal V4':

$$V4' = \hat{V2}^2 \cos^2\left(\frac{2\pi x}{\lambda}\right) \tag{5'}$$

Using the trigonometric equality:

$$\cos^2 A = \tfrac{1}{2} + (\cos 2A)/2 \tag{6'}$$

$$V4' = \frac{\hat{V2}^2}{2}\left[1 + \cos\left(\frac{4\pi x}{\lambda}\right)\right] \tag{7'}$$

In this case, filter 66a removes the DC term from equation 7' leaving a cosine signal at twice the input frequency.

Amplifiers 68a and 68b compensate for loss of gain in the preceding circuits. Multipliers 70a, 70b and filters 72a and 72b act in the same manner as multipliers 60a, 60b and filters 66a and 66b as described above, and thus filters 72a and 72b provide on lines 34 and 36 quadrature output signals at four times the input frequency with a small varying phase error $\phi$ as apparent from the right hand term of Equation 4.

Figure 4:
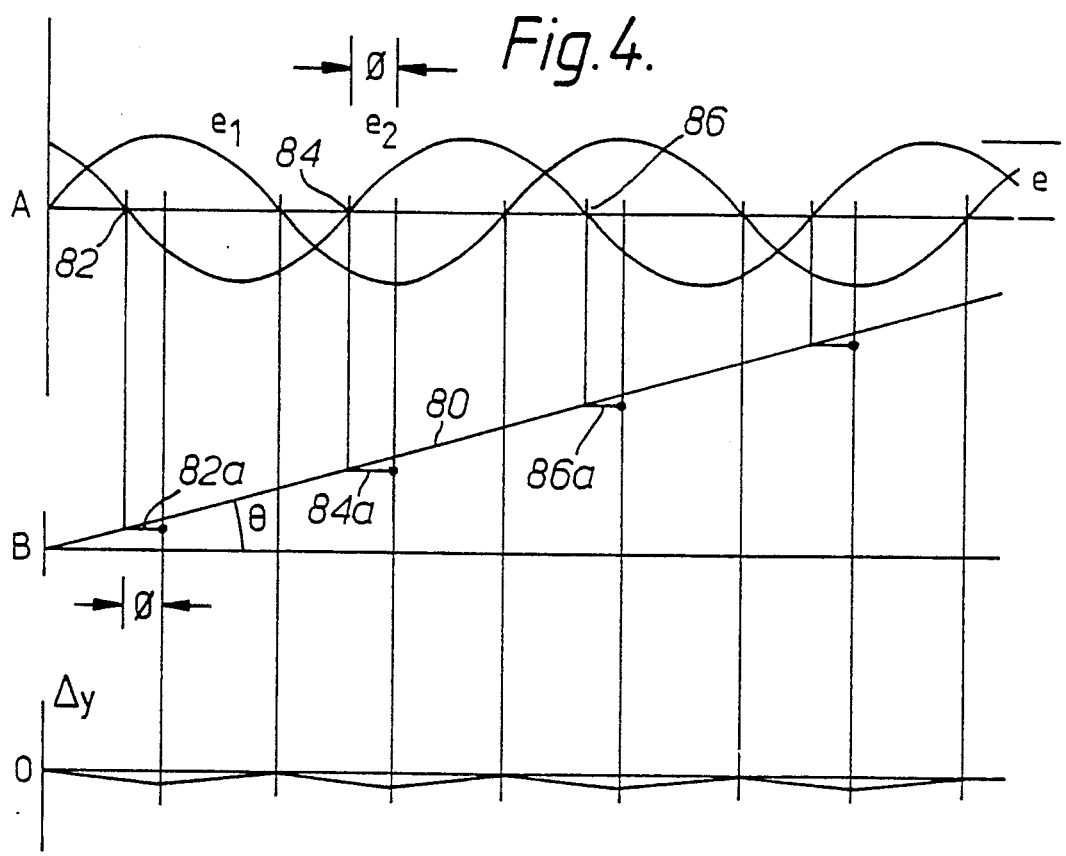
FIG. 4 is a waveform diagram illustrating operation of the preferred embodiment of the invention.

The effect of the phase error is illustrated in FIG. 4 in which waveform A illustrates the quadrature waves, with phase error $\phi$, output by the interpolator 32.

Figure 5:
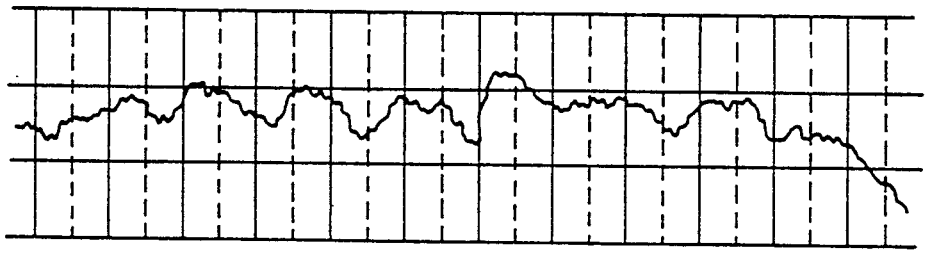
FIG. 5 illustrates a trace of surface texture which may be obtained utilising the invention.
Figure 6:
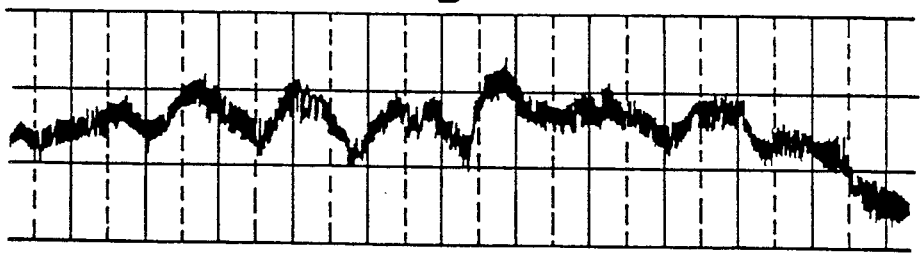
FIG. 6 illustrates a surface texture trace obtained when a filtering stage preferably included in the invention is omitted.

Waveform B, drawn on the assumption that the surface 6 being sensed is at an angle θ to the horizontal illustrates, in the solid line curve 80, the values of the signal from transducer 16 which would be output by microprocessor 42 in the absence of any phase error φ. However, in view of the phase error, zero crossing points, 82, 84, 86 etc arise slightly early so that values of the signal from transducer 16 slightly lower than the correct values are obtained by microprocessor 42, as indicated at 82a, 84a and 86a in FIG. 4. This gives rise to a noise signal, which is illustrated in curve C of FIG. 5, and which is in practice superimposed as an undesired modulation on the signal output by microprocessor 42. By inspection of FIG. 4, it can be seen that the noise signal C has a frequency twice that of the signals of curve A of FIG. 5. Filter 48 is a low pass filter which is provided to filter out the noise component C. The effect of filter 48 can be appreciated by consideration of FIGS. 5 and 6 in which FIG. 5 shows a trace obtained with the filter 48 present and FIG. 6 shows a trace obtained with the filter 48 absent. The action of the filter may alternatively be provided by the microprocessor 42 and conventional digital filtering techniques. These traces are reproductions of traces obtained in an experimental apparatus utilising a grating with a pitch of 8 microns, an interpolator 32 which produces quadrature output signals at four times the input frequency, the carriage 14 operating at a speed of 0.5 mm/s and the filter 48 or equivalent filtering out frequencies above 300 Hz, corresponding to surface wavelengths below 1.7 μm. In the arrangement described above, the quadrative noise would be at a frequency of about 1 kHz, and the DC offset noise would be at a frequency of about 500 Hz, both of which would be filtered out. Thus, it will be appreciated that utilising the interpolator 32 in accordance with the invention results in interpolation noise components which are at a higher frequency, than the frequency of the signals representing the surface characteristics of interest and accordingly such noise components are easily filtered out to provide a high resolution, clean trace as shown in FIG. 5 rather than the noisy trace of FIG. 6.

Various modifications are possible within the scope of the invention. For example, it is not necessary to include both stages of the interpolator in all applications. For example, a single stage could be included where it is only necessary to double the frequency of the input signals. Alternatively, more stages could be included where it is desired to produce higher multiples of the input frequency.

Although, in FIG. 3, each channel of the interpolator includes three filters, it would be possible to modify the arrangement to eliminate one or two of these filters, for example, while still achieving useful effects.

The invention is particularly advantageous when used in combination with an optical grating since it makes it possible to obtain a substantially higher resolution than could otherwise be achieved economically with optical gratings and since the effects of varying drift and phase errors associated with such gratings are easily eliminated. However, it is also possible to utilise the invention with other apparatus, for example interferometers, or rotary encoders.

Further, the invention can be applied to apparatus other than surface texture or form measuring apparatus. For example it could be applied in a coordinate measuring machine or in a machine tool particularly where it is required to resolve a signal of a given wavelength into finer intervals.

Just as one or more of the filters could, in certain applications, be eliminated from the interpolator circuit of FIG. 3, it is also possible to eliminate, in appropriate circumstances, the automatic gain control circuits and the amplifier.

Although in the drawings, it is assumed that the interpolator is implemented with analogue circuitry, it could alternatively be implemented digitally.

I claim:

1. An interpolator for receiving quadrature input signals at a first frequency and producing quadrature output signals at a second frequency which is a multiple of the first frequency, comprising means for producing first and second signals at double said first frequency and substantially in quadrature if the input signals are in quadrature, said producing means comprising squaring means for squaring one only of said input signals to provide said first signal and multiplying means for multiplying said input signals together to provide the second signal.

2. An interpolator according to claim 1 wherein said squaring means uses the trigonometric identity $\sin^2 A = \frac{1}{2} - (\cos 2A)/2$.

3. An interpolator according to claim 1 wherein said squaring means uses the trigonometric identity $\cos^2 A = \frac{1}{2} + (\cos 2A)/2$.

4. An interpolator according to claim 1 wherein said multiplying means uses the trigonometric identity $\sin A \cos A = (\sin 2A)/2$.

5. An interpolator according to claim 1 comprising high pass filtering means for removing DC drift components.

6. An interpolator according to claim 5, wherein said high pass filtering means is arranged to filter said input signals prior to said squaring and said multiplication.

7. An interpolator according to claim 1 comprising further squaring means for squaring one of said first and further signals and second multiplying means for multiplying said first and second signals together, to provide output signals in quadrature at four times said first frequency.

8. An interpolator according to claim 7, comprising filtering means for high pass filtering said first and second signals, to remove DC components therefrom.

9. An interpolator according to claim 7 comprising means for amplifying said first and second signals, prior to said squaring and said multiplication applied to said first and second signals, to compensate for loss of gain relative to said input signals.

10. An interpolator according to claim 7, comprising means for high pass filtering said output signals to remove DC components therefrom.

11. An interpolator according to claim 1 comprising automatic gain control means for controlling the gain of said input signals.

12. An interpolator according to claim 1 in association with a zero-crossing detector which receives the signals output by the interpolator.

13. A movement detector comprising an optical grating, light sensor means for producing quadrature signals in response to relative movement between said grating and said light sensor means, and an interpolator for producing quadrature output signals at a frequency which is a multiple of the frequency of the signals produced by the light sensor means, said interpolator receiving quadrature input signals in accordance with the signals produced by the light sensor means and comprising means for producing first and second signals at double the frequency of said quadrature input signals and substantially in quadrature if the input signals are in quadrature, said producing means comprising squaring means for squaring one only of said input signals to provide said first signal and multiplying means for multiplying said input signals together to provide the second signal.

14. Metrological apparatus comprising a surface sensor, means for causing said sensor to traverse the surface of a workpiece, and sampling means for sampling the output of said surface sensor during said traversing, said sampling means comprising a position detector for producing first quadrature signals in response to said traversing, an interpolator for producing further quadrature signals at a frequency which is a multiple of the frequency of the first quadrature signals, and means to effect said sampling in response to a predetermined condition in each of said further quadrature signals, said interpolator receiving quadrature input signals in accordance with said first quadrature signals produced by said position detector, and comprising means for producing first and second signals at double the frequency of said quadrature input signals and substantially in quadrature if the input signals are in quadrature, said producing means comprising squaring means for squaring one only of said input signals to provide said first signal and multiplying means for multiplying said input signals together to provide the second signal.

15. Apparatus according to claim 14, wherein said position detector comprises an optical grating and light sensor means.

16. Apparatus according to claim 14 including means for low pass filtering signals derived from the sensor for removing interpolation noise.

* * * * *

UNITED STATES PATENT AND TRADEMARK OFFICE
CERTIFICATE OF CORRECTION

PATENT NO. : 5,063,291

DATED : November 5, 1991

INVENTOR(S) : Ian K. Buehring

It is certified that error appears in the above-identified patent and that said Letters Patent is hereby corrected as shown below:

Column 2, line 2, the word "accompany" should read --accompanying--.

Column 2, line 5, the word "ma" should read --may--.

Column 2, line 50, the word "SO" should read --30--.

Column 6, line 40, the word "further" should read --second-- and the word "second" should read --further--.

Signed and Sealed this

Fourth Day of May, 1993

Attest:

MICHAEL K. KIRK

Attesting Officer

Acting Commissioner of Patents and Trademarks